United States Patent [19]

Florindez

[11] Patent Number: 5,060,562

[45] Date of Patent: Oct. 29, 1991

[54] ROTARY INDEXING MACHINE

[76] Inventor: Augusto Florindez, 13029 Ocaso Ave., La Mirada, Calif. 90638

[21] Appl. No.: 593,096

[22] Filed: Oct. 5, 1990

[51] Int. Cl.$^5$ .................. A47J 27/00; B65B 35/46; B65G 47/29

[52] U.S. Cl. .................. 99/353; 99/427; 99/485; 99/494; 221/266

[58] Field of Search .................. 99/352–355, 99/334, 426, 427, 440, 443 C, 485, 495, 450.1, 450.2; 221/266; 53/251, 534; 198/431

[56] References Cited

U.S. PATENT DOCUMENTS

| | | | |
|---|---|---|---|
| 2,376,960 | 5/1945 | Clem | 221/266 |
| 2,837,042 | 6/1958 | Laval, Jr. | 99/494 |
| 3,716,383 | 2/1973 | Yamamura | 99/353 |
| 3,954,204 | 5/1976 | Becker | 221/266 |
| 4,051,772 | 10/1977 | Johansson et al. | 99/427 |
| 4,308,974 | 1/1982 | Jones | 221/266 |
| 4,329,920 | 5/1982 | Rose et al. | 99/450.1 |
| 4,448,116 | 5/1984 | Muzzarelli | 99/494 |
| 4,668,524 | 5/1987 | Kirkpatrick | 99/353 |
| 4,815,959 | 3/1989 | Stoeckli et al. | 99/353 |
| 4,945,825 | 8/1990 | Florindez | 99/427 |

FOREIGN PATENT DOCUMENTS 0266697 10/1989 Japan .................. 221/266

Primary Examiner—Timothy F. Simone
Attorney, Agent, or Firm—Plante, Strauss, Vanderburgh and Connors

[57] ABSTRACT

Disclosed is a machine for manufacturing bakery products wherein a main drive motors powers feeding means for advancing rows of individual dough packets stepwise along an assembly line to a Ferris-wheel type conveyor including rows of cups into which individual dough packets are deposited row by row. The Ferris-wheel type conveyor is driven by the main drive motor to advance the rows of cup means step-wise row by row. The novel machine includes an inclined table with a surface over which the individual dough packets slide as the dough packets are advanced by the feeding means to the Ferris-wheel type conveyor. The table terminates at a lower end thereof near the Ferris-wheel type conveyor. A gate comprising a roller member with receptacles is positioned to receive the individual dough packets as the packets fall off the table member and into aligned receptacles. The roller has three rows of receptacles, with each row spaced apart from adjacent rows by 120°, with each row of receptacles having a number of receptacles equal to the number dough packets being advanced along the assembly line. A main drive motor rotates synchronously the Ferris-wheel type conveyor and the roller a 120° turn each time a row of dough packets is deposited in the Ferris-wheel type conveyor.

7 Claims, 2 Drawing Sheets

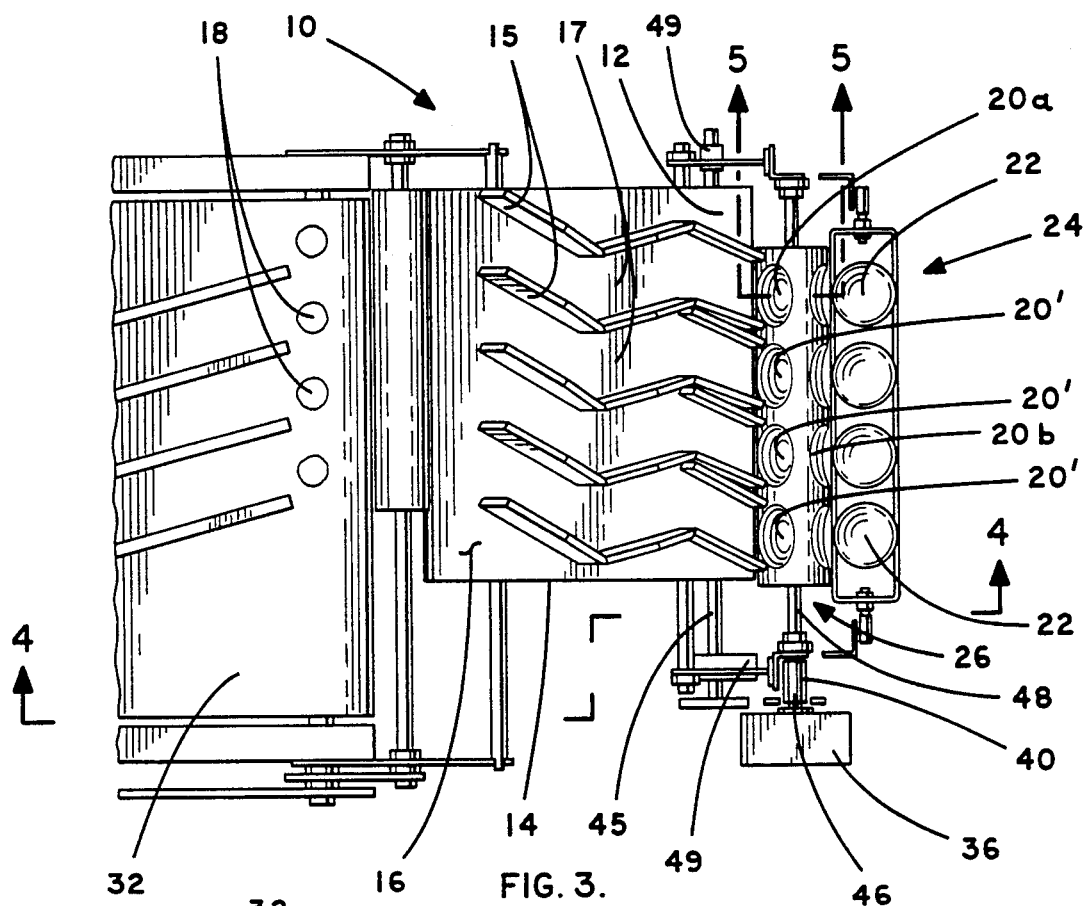
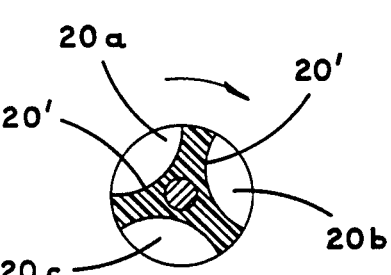
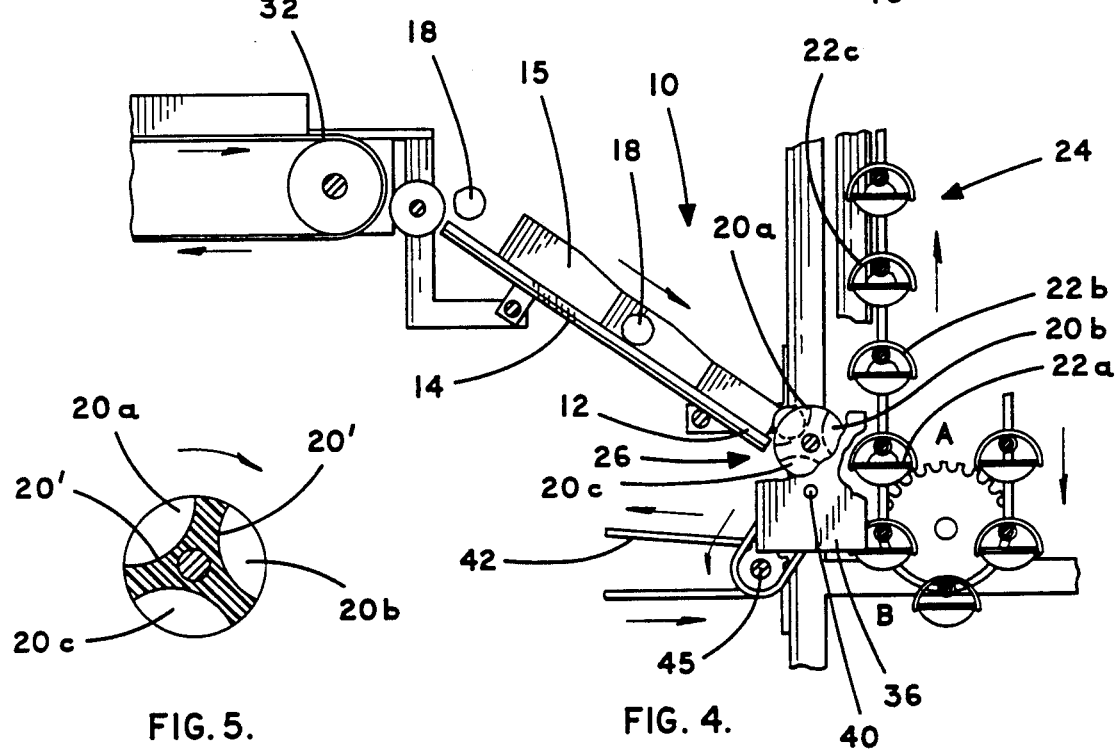

5,060,562

ROTARY INDEXING MACHINE

BACKGROUND OF THE INVENTION

1. Field of the Invention

This invention relates to an indexing machine used in the manufacture of bakery products.

2. Background Discussion

As illustrated in U.S. Pat. No. 4,945,825, it is conventional for dough balls or packets aligned in rows to be advanced incrementally in a step-wise fashion row by row along an assembly line. These packets are formed by conventional divider apparatus which cuts up a mass of dough into individual balls or packets that are fed to a Ferris-wheel-type conveyor along the assembly line. The Ferris-wheel type conveyor has a series of rows of cups into which the individual packets are deposited.

During a portion of the travel of these dough packets along the assembly line, they are dusted with flour and slide along an inclined table into the individual cups of the Ferris-wheel type conveyor. For example, a row of six dough balls or packets slide down the table and into the individual cups of the Ferris-wheel-like conveyor. There are six cups aligned in a row and positioned to receive the individual dough packets as they slide off the end of the table. The problem is that as the dough packets slide along the incline table, they do not reach the end of the table at precisely the same time.

SUMMARY OF THE INVENTION

It is the objective of the present invention to provide an indexing machine which insures that the individual dough packets sliding from the inclined table are all deposited in their respective individual cups in the Ferris-wheel type conveyor before the conveyor is advanced its next step.

The machine of this invention has several features, no single one of which is solely responsible for its desirable attributes. Without limiting the scope of this invention as expressed by the claims which follow, its more prominent features will now be discussed briefly. After considering this discussion, and particularly after reading the section of this application entitled, "DETAILED DESCRIPTION OF THE PREFERRED EMBODIMENT," one will understand how the features of this invention provide its advantages, which include precision feeding of the packets from the inclined table to transport apparatus and simplicity of installation and operation.

The first feature of this invention is that a main drive motor powers feeding means for advancing incrementally rows of individual dough packets step-wise along an assembly line to a Ferris-wheel type transport apparatus including rows of cups into which individual dough packets are deposited row by row. The transport apparatus is driven by the main drive motor to advance the rows of cup means step-wise row by row.

The second feature is the employment of gravity feed means in the assembly line having an inclined table member with a surface over which the individual dough packets slide as said dough packets are advanced by the feeding means to the transport apparatus. The table member terminates at a lower end thereof near the transport apparatus. There are guide elements on the table member defining a plurality of zig-zag pathways aligned substantially parallel to each other along which the individual dough packets slide as the dough packets are advanced. The pathways terminate at the lower end of the table member near the transport apparatus. The guide elements have movable sections to alter the direction the pathways, or expand the exit ends of the pathways through which the packets slide.

The third feature is the use of roller gate means between the table member and the transport apparatus. The gate means comprises a roller member having three rows of receptacles, with each row spaced apart from each other 120°. Each row of receptacles has a number of receptacles equal to the number dough packets being advanced towards the transport apparatus and is positioned to receive the individual dough packets as the packets fall off the table member and into aligned receptacles.

The fourth feature is drive mean which is rotated by the drive motor synchronously with the transport apparatus. The drive motor turns the roller member through 120° each time a row of dough packets is deposited in the transport apparatus. The drive means includes indexer means coupled to the drive motor which has an input shaft, an output shaft, and cam means coupling the input and output shafts. The cam means sets the degree of rotation of the output shaft to turn 120° for each 360° turn of the input shaft.

The fifth feature is that the feeding means and the drive motor are coupled to rotate synchronously, with the indexer means being coupled to the feeding means so that the input shaft of the indexer means is rotated 360° with each 360° turn of the drive motor's output shaft. During the first 180° turn of each 360° rotational cycle of the input shaft of the indexer means, the output shaft of the indexer means does not turn to provide a dwell period during which the gate means remains stationary in a position to receive the packets in the receptacles therein as said packets slide off the table member. During the second 180° turn of each 360° rotational cycle of this input shaft, the output shaft turns through a 120° turn, with the output shaft accelerating slightly during the first half of the second 180° turn of each 360° rotational cycle of the input shaft.

BRIEF DESCRIPTION OF THE DRAWING

The preferred embodiment of this invention, illustrating all its features, will now be discussed in detail. This embodiment depicts the novel and non-obvious machine of this invention shown in the accompanying drawing, which is for illustrative purposes only. This drawing includes the following FIGS., with like numerals indicating like parts:

FIG. 3 is a plan view of the rotary indexing machine of the present invention.

FIG. 4 is a cross-sectional view taken along line 4—4 of FIG. 3.

FIG. 5 is a cross-sectional view taken along line 5—5 of FIG. 2.

DETAILED DESCRIPTION OF THE PREFERRED EMBODIMENT

Figure 1:
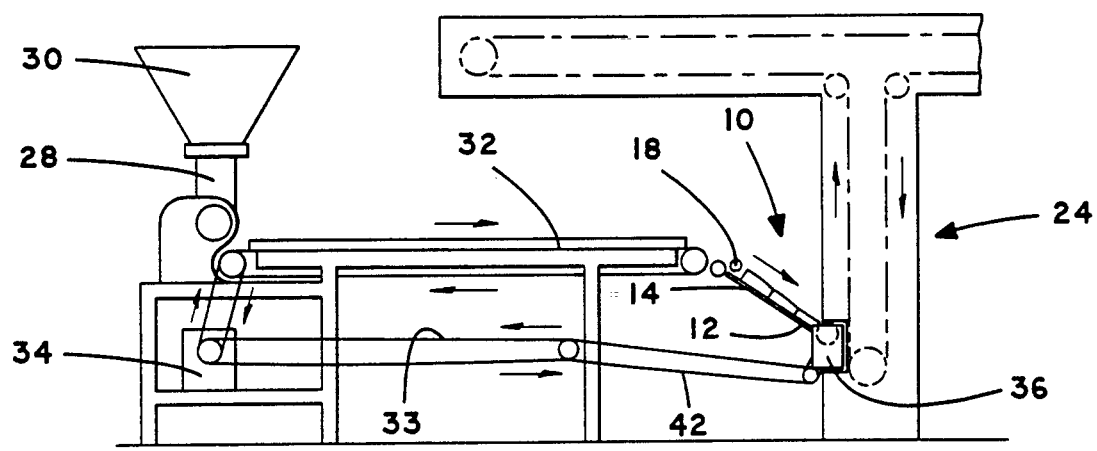
FIG. 1 is a schematic illustration of a conventional assembly line with the rotary indexing machine of this invention positioned between a Ferris-wheel conveyor and an inclined table in the assembly line.

As best illustrated in FIGS. 1 and 3, positioned in an assembly line for making bakery products is the rotary indexing machine 10 of this invention. This machine 10 is disposed between the lower end 12 of an inclined table 14, having a smooth surface 16 over which dough packets 18 slide and a Ferris-wheel conveyor 24. Rows 22a, 22b, 22c etc. of cups 22 are mounted in a Ferris-wheel like fashion in the conveyor 24.

A mass of dough (not shown) is placed in a hopper 30 which feeds a divider 28 that cuts the dough mass into the individual dough packets 18 and deposits them in rows on a generally horizontal conveyor 32, for example, four dough packets to a row. The packets 18 are more or less aligned with one another as the conveyor 32 moves them to the inclined table 14, but tend to slide or roll down the table at different rates so they do not all reach the end 12 of the table simultaneously.

The table 14 has a plurality of guide elements 15 position on it to define zig zag pathways 17 that lead from the upper portion of the table to its lower end 12 to direct the dough packets 18 rolling or sliding along the surface 16 into the receptacles 20' in the roller 20. There are moveable sections 15a in the guide elements 15 that allow the lower portion of the guideways to be moved or expanded, depending upon the type of dough packet being advanced.

As the Ferris-wheel type conveyor 24 turns in a step wise manner, each row 22a, 22b, 22c etc. of cups 22 moves into a receiving position A near a gate element 26 of the machine 10. The gate element 26 is in the form of a roller 20 which is between and immediately adjacent the end 12 and the receiving position A. The roller 20 has three rows 20a, 20b and 20c of receptacles 20'. Each row 20a, 20b and 20c is disposed relative to adjacent rows by 120°, as best illustrated in FIG. 5. The number of receptacles 20' equals the number of dough packets 18 in each row of packets being fed along the assembly line. In other words, the number of receptacles per row in the roller 20 equals the number of dough packets per row being produced. In this embodiment, there are four receptacles 20' per row 20a, 20b and 20c. As the dough packets slide off the end 12 of the table 14 they are guided into and deposited in the receptacles 20' in the roller 20. When the roller 20 is rotated, the packets 18 slide from the receptacles 20' and are caught by the cups 22. When the cups 22 in the conveyor 24 are inverted, the dough packets 18 drop from the cups onto another conveyor (not shown) as depicted in U.S. Pat. No. 4,945,825.

Both conveyors 24 and 32 are driven through conventional chain and sprocket linkages 33 by a main drive motor 34 to move in a step-wise fashion incrementally as the rows of dough packets 18 are produced by the divider 28. An indexer driver 36 is connected between the main drive motor 34 and the roller through the chain 38 so that the roller 20 is moved in synchronization with and in step-wise fashion with the conveyors 24 and 32. As will be explained in greater detail subsequently, the indexer driver 36 is coupled to the roller 20 so that the roller dwells in a stationary position for a brief period before being rotated. This allows all of the dough packets 18 in a single row to slide off the end 12 of the table 14 into their respectively aligned receptacles 20' in the roller 20. When this has occurred, the roller 20 is rotated through a 120° turn to position it with respect to the cups 22 in a row of cups in in the receiving position A. This is done in a step-wise fashion so the roller turns 120° with each step.

A conventional indexer driver 36 is employed such as sold by Camco Corporation. This indexer driver 36 has an output shaft 46 connected to the shaft 48 of the roller 20, an input shaft 40 connected to the main drive motor 34 through a chain 42 and a sprocket 44 carried on a jack shaft 45 mounted on bearing blocks 49. It also includes a series of cams (not shown) which are adjusted so that during the first 180° of turn of each 360°, rotational cycle of the input shaft 40, the output shaft 46 does not turn at all. This provides a dwell period for the gate element 26 where the roller 20 remains stationary with the receptacles 20' aligned opposite each end of each pathway 17 so that the dough packets 18 simply roll off the end 12 of the table 14 into an aligned receptacle 20'. During the second 180° turn of each 360° rotational cycle of the input shaft 40, the output shaft 46 turns through 180°. This brings one row receptacles 20' into alignment with the row of cups 22 that are moved from a lower position B into the receiving position A as illustrated in FIG. 4. These rows of cups advance continuously through the receiving position A and do not stop at the receiving position A.

Operation

Figure 2:
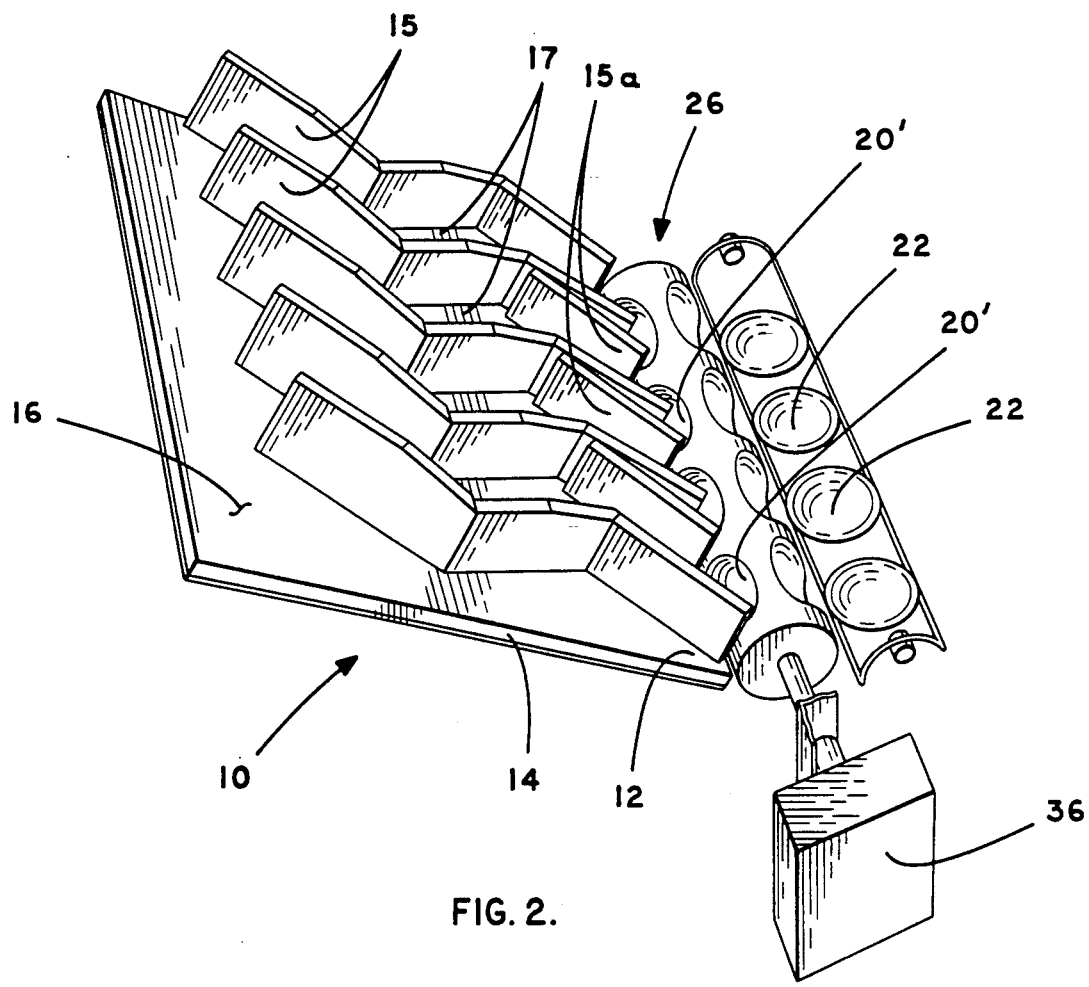
FIG. 2 is a perspective view of the rotary indexing machine of the present invention.

The main drive motor 34 turns the drive chain and sprocket linkages 33 in directions indicated by the arrows so that the rows of cups 22 advance step-wise to the receiving position A as depicted in FIGS. 2, 3, and 4. With each step of the conveyors 24 and 32, a row of dough packets 18 is produced by the divider 28. The rows of individual dough packets 18 are advanced step-wise by the horizontal conveyor 32 until they fall from the end of this conveyor onto the surface 16 of the inclined table 14. Flour (not shown) is periodically sprinkled onto the surface 16 to assist the dough packets 18 in rolling or sliding down the surface 16 to the end 12 of the table 14. The guide elements 15 direct these dough packets along the zig-zag pathways 17, but the dough packets do not reach the end 12 at precisely the same time. The roller 20 is maintained in a stationary position for a sufficient dwell period to allow each individual packet 18 to be deposited in its corresponding receptacle 20' adjacent the end of each pathway 17. This is accomplished by only allowing the roller 20 to rotate during half of the cycle of the input shaft 40. The indexer driver 36 accomplishes this. Preferably, it is set up so that during the 180° turn which moves the row of receptacles into the receiving position A. There is an acceleration during the first half of the 120° turn. When the roller has been rotated through a 120° turn, it is now moved from the receiving position A to a deposit position where the dough packets roll from the receptacles 20' into the cups 22 that are moving through the receiving position A. Thus, with each step-wise or incremental movement of the conveyors 24 and 32, the roller 20 is rotated through a 120° turn, remaining briefly in a stationary or dwell position to receive the dough packets 18 as they roll off the incline table 14 into the receptacles 20'.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims:

I claim

1. A machine for manufacturing bakery products wherein main drive means powers feeding means for advancing rows of individual dough packets step-wise along an assembly line to a transport apparatus including rows of cup means into which individual dough packets are deposited row by row, said transport apparatus being driven by said main drive means to advance the rows of cup means step-wise row by row, including gravity feed means in the assembly line having an inclined table member with a surface over which the individual dough packets slide as said dough packets are advanced by the feeding means to the transport apparatus, said table member terminating at a lower end thereof near the transport apparatus, roller gate means between the table member and the transport apparatus, said gate means comprising a roller member having three rows of receptacles spaced apart from each other 120°, with each row of receptacles having a number of receptacles equal to the number dough packets being advanced towards the transport apparatus and positioned to receive the individual dough packets as said packets fall off the table member and into aligned receptacles, and drive means for rotating synchronously with the transport apparatus said gate means through a 120° turn each time a row of dough packets are deposited in the transport apparatus.

2. The machine of claim 1 wherein the drive means includes indexer means coupled to the drive means which has an input shaft, an output shaft, and cam means coupling the input and output shafts which sets the degree of rotation of the output shaft to turn 120° for each 360° turn of the input shaft.

3. The machine of claim 2 wherein feeding means and the drive means are coupled to rotate synchronously, with the indexer means being coupled to the feeding means so that the input shaft is rotated 360° with each 360° turn of the drive means.

4. The machine of claim 3 wherein, during the first 180° turn of each 360° rotational cycle of the input shaft, the output shaft does not turn to provide a dwell period during which the gate means remains stationary at said lower end in a position to receive the packets in the receptacles therein as said packets slide off the table member, and, during the second 180° turn of each 360° rotational cycle of the input shaft, the output shaft turns through a 120° turn.

5. The machine of claim 4 wherein the output shaft accelerates slightly during the first half of the second 180° turn of each 360° rotational cycle of the input shaft.

6. The machine of claim 1 including guide elements on the table member defining a plurality of zig zag pathways aligned substantially parallel to each other along which the individual dough packets slide as said dough packets are advanced by the feeding means to the transport apparatus, said pathways terminating at said lower end of the table member near the transport apparatus.

7. The machine of claim 6 wherein the guide elements have movable sections to alter the direction the pathways.

* * * * *